United States Patent [19]

Young

[11] 4,143,925
[45] Mar. 13, 1979

[54] VEHICLE FLUID PRESSURE BRAKING SYSTEM

[75] Inventor: Alastair J. Young, Kenilworth, England

[73] Assignee: Automotive Products Limited, Warwickshire, England

[21] Appl. No.: 868,692

[22] Filed: Jan. 11, 1978

[30] Foreign Application Priority Data

Jan. 14, 1977 [GB] United Kingdom ............... 01519/77

[51] Int. Cl.² .............................................. B60T 8/18
[52] U.S. Cl. .............................. 303/22 R; 280/112 A; 280/714
[58] Field of Search ................. 303/22 R; 280/112 A, 280/702, 708, 709, 711, 714

[56] References Cited

U.S. PATENT DOCUMENTS

3,885,809   5/1975   Pitcher .......................... 280/112 A

FOREIGN PATENT DOCUMENTS

2600288   5/1976   Fed. Rep. of Germany ........ 303/22 R

Primary Examiner—Trygve M. Blix
Assistant Examiner—Reinhard J. Eisenzopf
Attorney, Agent, or Firm—Kemon & Estabrook

[57] ABSTRACT

The braking system is of the kind in which two separate load-sensitive modulating valves are used in the rear brake lines of a vehicle having a fluid suspension system. To cope with cornering conditions when pressure in the rear suspension struts is not a true measure of the load carried by each rear wheel the modulating valves each have two control ports for connection to separate parts of the suspension system each control port being connected to a different area of a piston which creates the biassing force for the modulating valve. As a result, the biassing force on each valve is a true reflection of the load carried by the respective wheel.

3 Claims, 3 Drawing Figures

VEHICLE FLUID PRESSURE BRAKING SYSTEM

The invention relates to vehicle fluid pressure braking systems of the kind in which a first value is interposed between a driver-controlled source and a brake acting on a first wheel of the vehicle and a second valve is interposed between the driver-controlled source and a second brake acting on a second wheel transversely opposite the first wheel, the pressure supplied to the first brake being modulated by the first valve in accordance with the vertical load supported by the first wheel and the pressure supplied to the second brake being modulated by the second valve in accordance with the vertical load supported by the second wheel such that the fluid pressure supplied to each brake is less when the vertical load supported by the respective wheel is relatively low than when the vertical load is relatively high.

Fluid suspension systems for vehicles are well known. A suspension strut interposed between a suspension component which moves with vertical movement of a road wheel and a vehicle body component supports the weight of the vehicle transmitted through to the road wheel such that the fluid pressure in the strut is substantially proportional to the direct load carried by the strut. Usually the mass of fluid is varied to provide a self-levelling suspension system. If the fluid is air or some other gas, than this acts as the suspension spring. If the fluid is oil or some other liquid, then an accumulator, usually a gas spring type, is incorporated into the strut or connected to it to provide the suspension spring.

In many fluid suspension systems the measurement of a fluid pressure in a particular strut is not always a direct indication of the vertical load carried by the associated wheel. This is usually because the suspension has anti-roll properties during cornering which may arise from the use of particular suspension geometry, the use of an anti-roll bar, or may be due to an interconnection of the strut with another to give similar anti-roll properties.

An object of the invention is to provide a vehicle fluid pressure braking system of the kind described which is controlled by a fluid suspension system in which measurement of a fluid pressure in a particular strut is not a direct indication of the vertical load carried by the associated wheel under all driving conditions.

According to the invention there is provided a vehicle braking system of the kind in which a first valve is interposed between a driver-controlled source and a brake acting on a first wheel of the vehicle and a second valve is interposed between the driver-controlled source and a second brake acting on a second wheel transversely opposite the first wheel, the pressure supplied to the first brake being modulated by the first valve in accordance with the vertical load supported by the first wheel and the pressure supplied to the second brake being modulated by the second valve in accordance with the vertical load supported by the second wheel such that the fluid pressure supplied to each brake is less when the vertical load supported by the respective wheel is relatively low than when the vertical load is relatively high, each valve comprising an inlet port connected to the driver-controlled source, an outlet port connected to the respective brake, a control port for connection to part of a fluid suspension system on the vehicle which can supply a pressure which depends on the load carried by the respective wheel, a plunger movable by pressure at the outlet port in a direction which closes communication from the inlet port to the outlet port and a piston having a piston area thereon which is subject to pressure at the control port to create a biassing force which acts on the plunger to bias the plunger in the other direction, wherein each valve further comprises an auxiliary control port for connection to another part of the suspension system and an auxiliary piston area on the piston connected to the auxiliary control port so that pressure in said other part of the suspension system can modify the biassing force on the plunger such that the resultant biassing force is substantially proportional to the load carried by the respective wheel under all driving conditions.

In one embodiment the invention provides a vehicle braking system as set forth in the immediately preceding paragraph and a vehicle suspension system which includes a first strut for supporting the vertical load carried by said first wheel and a second strut for supporting the vertical load carried by said second wheel, each strut having one piston area subject to one suspension system pressure which depends on the mean vertical load supported by the first and second wheels and another piston area which is subject to another suspension system pressure which depends on the vertical load carried by the diagonally opposite wheel, the arrangement being such that the control port of each valve is connected to said one suspension system pressure, the auxiliary control port of the first valve is connected to the other suspension system pressure acting on the first strut and the auxiliary control port of the second valve is connected to the other suspension system pressure acting on the second strut.

In another embodiment the invention provides a vehicle braking system as set forth in said preceding paragraph and a vehicle suspension system which includes a first strut for supporting the vertical load carried by said first wheel and a second strut for supporting the vertical load carried by said second wheel, the control port of the first valve being connected to the first strut, the auxiliary control port of the first valve being connected to the second strut, the control port of the second valve being connected to the second strut and the auxiliary control port of the second valve being connected to the first strut.

The invention will now be described by way of example and with reference to the accompanying drawings, of which:

Figure 1:
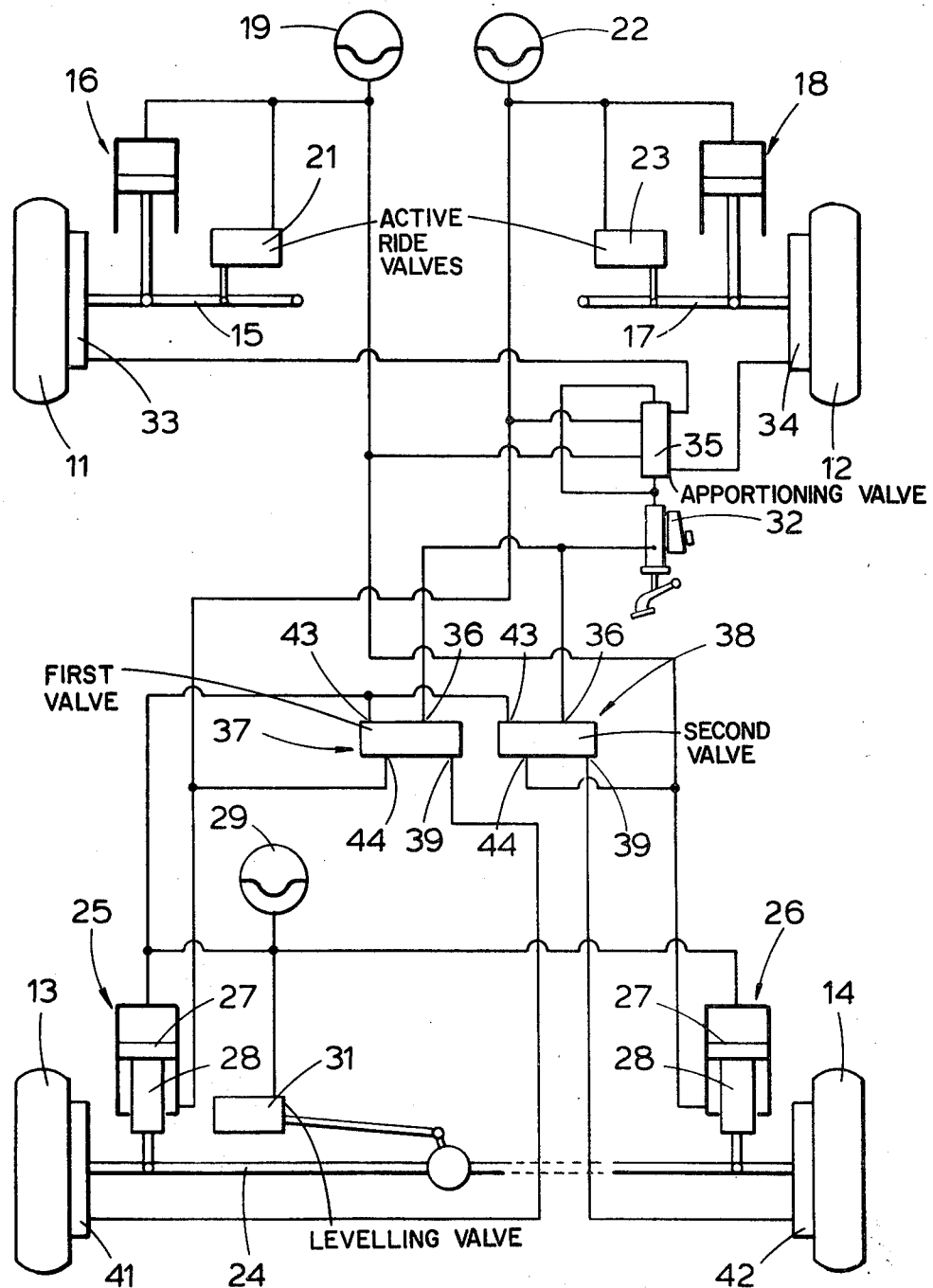
FIG. 1 is a diagrammatic plan/rear elevation of a vehicle fluid suspension system and one embodiment of a fluid pressure braking system according to the invention.

FIG. 1 shows first and second front wheels 11, 12 respectively and first and second rear wheels 13, 14 respectively. Front wheel 11 is suspended on a suspension arm 15 supported by a hydraulic strut 16 and front wheel 12 is similarly suspended on a suspension arm 17 supported by strut 18. Strut 16 is connected to a gas spring accumulator 19 controlled by an active-ride valve 21 of the kind described in our British patent specification No. 1,197,812. Another accumulator 22 is connected to the other strut 18 and is controlled by a valve 23 of the same kind as valve 21.

The rear wheels 13 and 14 are suspended on a rear axle 24 supported by a hydraulic strut 25 on one side and a hydraulic strut 26 on the other side. Each rear strut 25, 26 has a piston 27 and a relatively large diameter piston rod 28. The upper surface of each piston 27 is connected to an accumulator 29 and a levelling valve 31 controlled by the axle 24. However, the lower surface of the piston 27 of strut 25 is connected to the diagonally opposite strut 18 and similarly the lower surface of piston 27 of strut 26 is connected to the diagonally opposite strut 16. The purpose of the interconnections of the struts is to provide roll-stiffness on the rear suspension, the system being described in detail in our British patent specification No. 1,384,454.

The vehicle has a tandom brake master cylinder 32 having one outlet connection to brakes 33, 34 on the front wheels 11, 12 respectively via an apportioning valve 35. The other outlet connection on the master cylinder 32 is to the inlet ports 36 of a first valve 37 and a second valve 38. The first valve 37 has an outlet port 39 connected to a brake 41 on rear wheel 13 and the second valve 38 has its outlet port 39 connected to a brake 42 on the other rear wheel 14. A control port 43 on each valve 37, 38 is connected to the rear gas spring 29. An auxiliary control port 44 on each valve 37, 38 is connected to the diagonally opposite front strut 18, 16 respectively.

Figure 2:
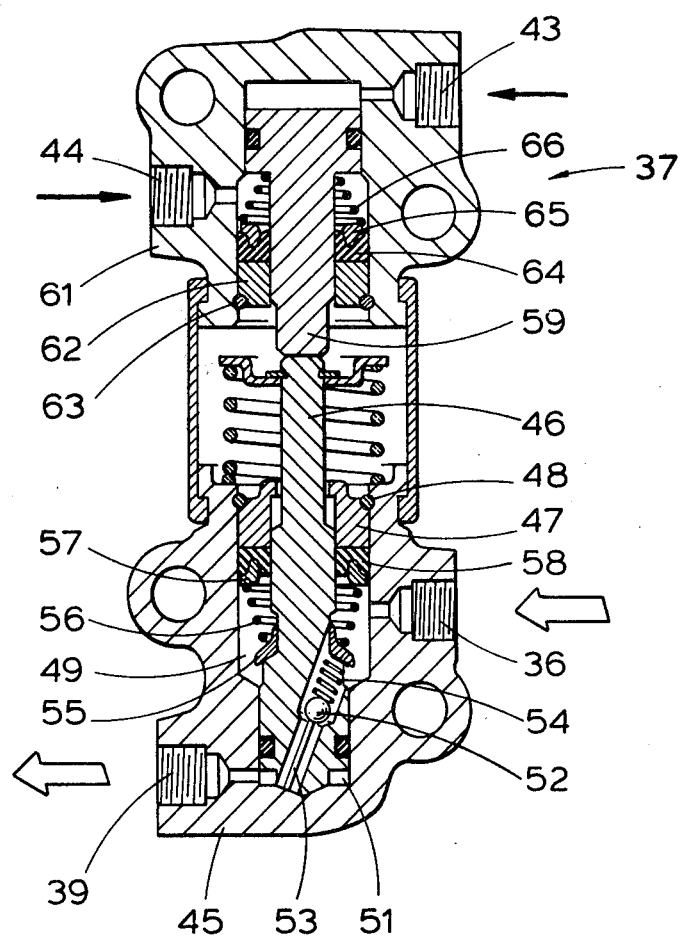
FIG. 2 is a cross-section of one of the valves shown in FIG. 1.

FIG. 2 shows valve 37 in detail, valve 38 being identical. It comprises two housings 45 and 61 rigidly bolted to a bracket. The first housing 45 has a stepped bore which receives a stepped plunger 46. The larger working diameter portion of the stepped plunger 46 is a sliding fit in the smaller diameter bore portion whilst the smaller working diameter portion of the plunger 46 is slidable in a bush 47 retained in the larger diameter bore portion by a circlip 48. The plunger 46 and bush 47 divides the space inside the housing into an annular chamber 49, connected to the inlet port 36, and an end chamber 51, connected to the outlet port 39 and closed by the blind end of the stepped bore.

A stepped drilling, angled with respect to the axis of plunger 46 but intersecting it, provides communication between the inlet port 36 and the outlet port 39. The step in the angled drilling provides a seat for a non-return valve ball 52 which is unseated by a pin 53 when the plunger 46 approaches or abuts the end of the housing 45, the pin 53 having four flats to allow flow through the drilling.

A light compression spring 54 biases the ball 52 towards its seated position, the spring 54 reacting against a resilient plastic collar 55 having a longitudinal slit to allow fitting over the plunger 46. Another light compression spring 56 keeps the collar 55 is place and serves to bias a seal expander ring 57 into engagement with a cup-type rubber seal ring 58 used to seal the bush 47.

The non-return valve ball 52 acts to prevent communication from the inlet port 36 to the outlet port 39 when the plunger 46 is moved away from the blind end of housing 45 by brake pressure at the outlet port 39 acting on the smaller diameter working portion of the plunger 46. Such movement is resisted by pressure at the control port 43 acting on one end face of another stepped plunger 59 slidable in a stepped blind bore in the second housing 61. The biassing force created by pressure at the control port 43 acting on the end face of plunger 59 is partially offset by pressure from the auxiliary control port 44 acting on an auxiliary annular piston area defined by the step between the larger and smaller working diameters of the plunger 59. The smaller working diameter of plunger 59 is guided by a bush 62 which is retained by circlip 63 and sealed by a rubber cup seal 64, similar to seal 58. A spreader 65, similar to spreader 57, is held in position by a light compression spring 66.

The plunger 46 is prevented from moving away from the blind end of housing 45 until brake pressure at the outlet port 39 has risen sufficiently, the ball 52 seating at a brake pressure which is dependent on the biassing load from plunger 59. Once ball 52 has seated, a small increase in master cylinder pressure acting in chamber 49 moves the plunger 46 back towards the blind end of housing 45 to allow a further quantity of fluid through to the rear brakes, the increased pressure in chamber 51 having the immediate effect of moving the plunger 46 away from the blind end once more. Thus a progressively increasing master cylinder pressure causes the plunger 46 to shuttle to and fro, seating and unseating ball 52 and causing the rear brake pressure at the outlet port 39 to increase at a reduced rate compared to master cylinder pressure at the inlet port 36.

The valve maintains substantially the same relationship between master cylinder pressure and brake pressure whilst master cylinder pressure is decreasing, but the ball 52 is not unseated until master cylinder pressure bas dropped to the same value as the brake pressure. The initial reduction in brake pressure is caused by movement of plunger 46 away from the blind end of housing 45 to increase the volume of the end chamber 51.

The piston areas of plunger 59 are in a substantially similar ratio to those of piston 27 so that the biassing load on plunger 46 is varied according to the vertical load carried by wheel 13. Hence the braking torque applied to wheel 13 is limited according to the vertical load carried by that wheel. This remains true during cornering since although pressure in gas spring 27 remains constant (ignoring bumps which affect both rear wheels) the pressure in the front gas spring 22 varies according to the centripetal acceleration, reducing in a right-hand corner and increasing in a left-hand corner.

Since valve 38 is identical to valve 37 and the braking and suspension system is symmetrical the operation of valve 38 is directly similar to that described above for valve 37.

Figure 3:
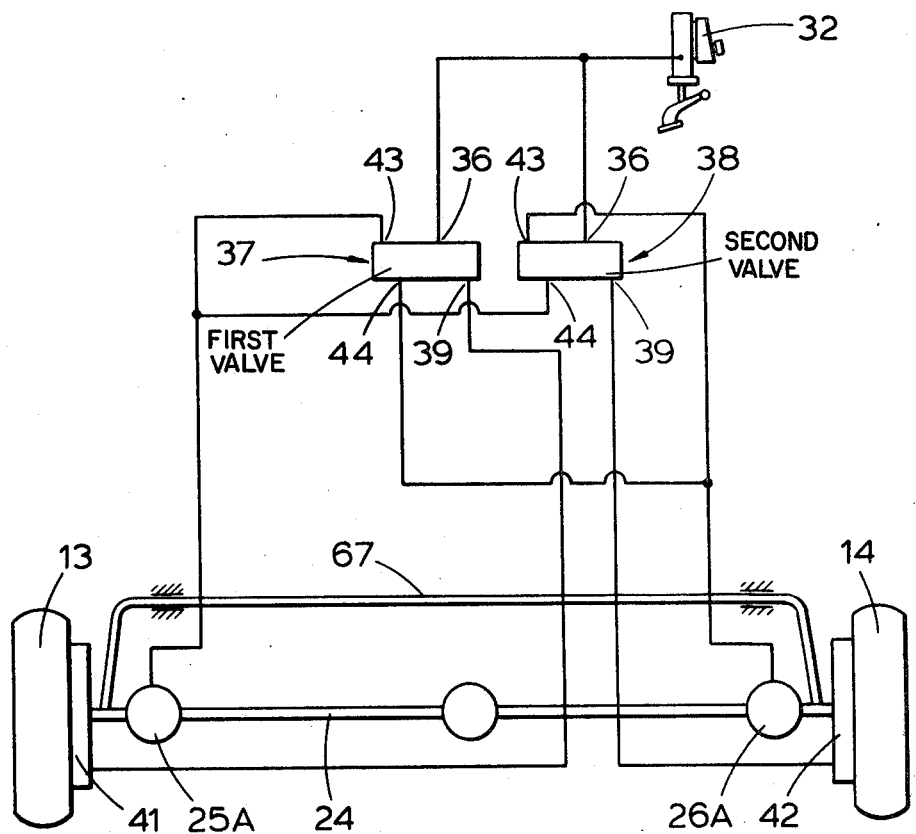
FIG. 3 is a diagram of another vehicle fluid suspension system and another embodiment of a fluid pressure braking system according to the invention.

In FIG. 3 self contained suspension struts 25A and 26A of the self-pumping type are used in place of the rear struts 25 and 26, and the front suspension has conventional coil springs. The valves 37 and 38 are used with the same connections to the master cylinder 32 and to the brakes 41 and 42 but control port 43 of the first valve 37 is connected to the first strut 25A and the control port of the second valve 38 is connected to the second strut 26A. However, the auxiliary control port 44 of the first valve 37 is connected to the second strut 26A and the auxiliary control port 44 of the second valve 38 is connected to the first strut 25A.

The rear suspension uses an anti-roll bar 67 so that the pressure in each strut 25A or 26A is not a measure of the load carried by the respective rear wheel under cornering conditions. The connection to the auxiliary control port corrects this by modifying the load exerted on the plunger 46 by the piston 59 due to the pressure at the control port.

In some fluid suspension systems the struts are used with auxiliary springs such as coil springs. In that case it is only necessary to incorporate a spring into each valve 37 and 38 to create an appropriate preload on the plunger 46.

I claim:

1. A vehicle braking system of the kind in which a first valve is interposed between a driver-controlled source and a brake acting on a first wheel of the vehicle and a second valve is interposed between the driver-controlled source and a second brake acting on a second wheel transversely opposite the first wheel, the pressure supplied to the first brake being modulated by the first valve in accordance with the vertical load supported by the first wheel and the pressure supplied to the second brake being modulated by the second valve in accordance with the vertical load supported by the second wheel such that the fluid pressure supplied to each brake is less when the vertical load supported by the respective wheel is relatively low than when the vertical load is relatively high, each valve comprising an inlet port connected to the driver-controlled source, an outlet port connected to the respective brake, a control port for connection to part of a fluid suspension system on the vehicle which can supply a pressure which depends on the load carried by the respective wheel, a plunger movable by pressure at the outlet port in a direction which closes communication from the inlet port to the outlet port and a piston having a piston area thereon which is subject to pressure at the control port to create a biassing force which acts on the plunger to bias the plunger in the other direction, wherein each valve further comprises an auxiliary control port for connection to another part of the suspension system and an auxiliary piston area on the piston connected to the auxiliary control port so that pressure in said other part of the suspension system can modify the biassing force on the plunger such that the resultant biassing force is substantially proportional to the load carried by the respective wheel under all driving conditions.

2. A vehicle braking system according to claim 1 and a vehicle suspension system which includes a first strut for supporting the vertical load carried by said first wheel and a second strut for supporting the vertical load carried by said second wheel, each strut having one piston area subject to one suspension system pressure which depends on the mean vertical load supported by the first and second wheels and another piston area which is subject to another suspension system pressure which depends on the vertical load carried by the diagonally opposite wheel, the arrangement being such that the control port of each valve is connected to said one suspension system pressure, the auxiliary control port of the first valve is connected to the other suspension system pressure acting on the first strut and the auxiliary control port of the second valve is connected to the other suspension system pressure acting on the second strut.

3. A vehicle braking system according to claim 1, and a vehicle suspension system which includes a first strut for supporting the vertical load carried by said first wheel and a second strut for supporting the vertical load carried by said second wheel, the control port of the first valve being connected to the first strut, the auxiliary control port of the first valve being connected to the second strut, the control port of the second valve being connected to the second strut and the auxiliary control port of the second valve being connected to the first strut.

* * * * *